United States Patent
Amara et al.

(10) Patent No.: US 9,154,203 B2
(45) Date of Patent: *Oct. 6, 2015

(54) DOUBLE-ITERATIVE METHOD OF TRANSMITTING MULTIPLE STREAMS PER USER IN A MULTI-USER MIMO SYSTEM, AND A CORRESPONDING TRANSMITTER, COMPUTER PROGRAM PRODUCT, AND DATA MEDIUM

(75) Inventors: Mustapha Amara, Sousse (TN); Julie Yuan-Wu, Versailles (FR); Dirk Slock, Vallauris (FR)

(73) Assignee: France Telecom, Paris (FR)

( * ) Notice: Subject to any disclaimer, the term of this patent is extended or adjusted under 35 U.S.C. 154(b) by 17 days.

This patent is subject to a terminal disclaimer.

(21) Appl. No.: 13/823,937

(22) PCT Filed: Sep. 21, 2011

(86) PCT No.: PCT/FR2011/052177
§ 371 (c)(1),
(2), (4) Date: Mar. 15, 2013

(87) PCT Pub. No.: WO2012/038661
PCT Pub. Date: Mar. 29, 2012

(65) Prior Publication Data
US 2013/0182788 A1 Jul. 18, 2013

(30) Foreign Application Priority Data

Sep. 24, 2010 (FR) ..................................... 10 57717

(51) Int. Cl.
*H04B 7/04* (2006.01)
*H04B 7/06* (2006.01)
*H04B 7/08* (2006.01)

(52) U.S. Cl.
CPC ............ *H04B 7/0452* (2013.01); *H04B 7/0426* (2013.01); *H04B 7/0617* (2013.01); *H04B 7/0854* (2013.01); *H04B 7/0857* (2013.01); *H04B 7/0465* (2013.01)

(58) Field of Classification Search
CPC ...... H04B 7/024; H04B 7/026; H04B 7/0404; H04B 7/0408; H04B 7/0413; H04B 7/0426; H04B 7/0452; H04B 7/0456; H04B 7/0465; H04B 7/0617; H04B 7/0817; H04B 7/0854; H04B 7/0857
USPC .................. 375/141, 143, 144, 146, 148, 152, 375/259–262, 265, 267; 370/310, 328, 334, 370/339; 455/500, 526, 67.11
See application file for complete search history.

(56) References Cited

U.S. PATENT DOCUMENTS 7,839,944 B2 * 11/2010 Lee et al. ........................ 375/267
8,059,733 B2 * 11/2011 Khojastepour et al. ........ 375/260

(Continued)

OTHER PUBLICATIONS

International Search Report and Written Opinion dated Jan. 10, 2012 for corresponding International Application No. PCT/FR011/052177, filed Sep. 21, 2011.

(Continued)

*Primary Examiner* — Young T Tse
(74) *Attorney, Agent, or Firm* — David D. Brush; Westman, Champlin & Koehler, P.A.

(57) ABSTRACT

A multi-stream transmission method and device are provided for transmitting N data streams allocated to K different users. The method is implemented by a transmitter for a multi-user MIMO system having $N_T$ transmit antennas and $$\sum_{k=1}^{K} N_{R_k}$$

receive antennas associated with K receivers respectively associated with the K users. The method includes: performing a succession of two different iterative algorithms for calculating K precoding matrices of a linear precoder and K decoding matrices of a receiver, the receiver being of the normalized MF type with a Frobenius norm for the first algorithm, and the second iterative algorithm being initialized by a value output by the first iterative algorithm; and before each calculation of precoding matrices, calculating weights for weighting all of the streams.

7 Claims, 5 Drawing Sheets

(56) References Cited

U.S. PATENT DOCUMENTS

| | | | |
|---|---|---|---|
| 2008/0080459 A1* | 4/2008 | Kotecha et al. | 370/342 |
| 2011/0080961 A1* | 4/2011 | Hui et al. | 375/259 |
| 2011/0249629 A1* | 10/2011 | Ko et al. | 370/329 |

OTHER PUBLICATIONS

Chengwen Xing et al., "Robust Joint Design of Linear Relay Precoder and Destination Equalizer for Dial-Hop Amplify-and-Forward MIMO Relay Systems", IEEE Transactions on Signal Processing, IEEE Service Center, New York, NY, US, vol. 58, No. 4, Apr. 1, 2010, pp. 2273-2283, XP011286392.

Mustapha Amara et al., "Optimal MU-MIMO Precoder with MISO Decomposition Approach", Signal Processing Advances in Wireless Communications (SPAWC), 2010 IEEE Eleventh International Workshop on, IEEE, Piscataway, NJ, USA, Jun. 20, 2010, pp. 1-5, XP031837283.

Hakjea Sung et al., "Linear Precoder Designs for K-User Interference Channels", IEEE Transactions on Wireless Communications, IEEE Service Center, Piscataway, NJ, US, vol. 9, No. 1, Jan. 1, 2010, pp. 291-301, XP011287347.

Sheng Liu et al., "A New Joint Interative Transceiver Design with Interference Alignment Method", Wireless and Optical Communciations Conference (WOCC), 2010 19th Annual, IEEE, Piscataway, NJ, USA, May 14, 2010, pp. 1-5, XP031709484.

Mustapha Amara et al., "Receiver and Transmitter Iterative Optimization Using Maximum Sum-Rate Criterion for Multi-User MIMO Systems", Communications, Control and Signal Processing (ISCCSP), 2010 4th International Symposium on, IEEE, Piscataway, NJ, USA, Mar. 2, 2010, pp. 1-6, XP031675687.

French Search Report and Written Opinion dated May 9, 2011 for corresponding French Application No. 10 57717, filed Sep. 24, 2010.

Y. Wu et al., "Multiuser MIMO Downlink Precoder Design Based on the Maximal SJNR Criterion," IEEE GLOBECOM 2005 proceedings, pp. 2694 2698.

H. Wang et al., "Robust Transmission for Multiuser MIMO Downlink Systems with Imperfect CSIT," IEEE WCNC 2008, pp. 340 344.

M. Costa, "Writing on Dirty Paper," IEEE Trans. Inf. Theory, vol. 29, No. 3, pp. 439 441, May 1983.

G. Caire et al., "On the achievable throughput of a multiantenna Gaussian broadcast channel," IEEE Trans. Inform. Theory, vol. 49, No. 7, pp. 1691 1706, Jul. 2003.

J. Zhang et al., "Joint linear transmitter and receiver design for the downlink of multiuser MIMO systems," IEEE Commun. Lett., vol. 9, No. 11, pp. 991 993, Nov. 2005.

M. Lee et al., "A Per-User Successive MMSE Precoding Technique in Multiuser MIMO Systems," IEEE Vehicular Technology Conference (VTC2007-Spring), pp. 2374 2378, Apr. 22-25, 2007.

Q.H. Spencer et al., "Zero-forcing methods of downlink spatial multiplexing in multiuser MIMO channels," IEEE Trans. Signal Process., vol. 52, No. 2, pp. 461 471, Feb. 2004.

S.S. Christensen et al., "Weighted Sum rate Maximization Using Weighted MMSE for MIMO-BC Beamforming Design," Communications, 2009. ICC '09. IEEE International Conference on, vol., No., pp. 1 6, Jun. 14-18, 2009.

N. Jindal et al., "Sum power iterative water-filling for multi-antenna gaussian broadcast channels," IEEE Trans. Inform. Theory, vol. 51, pp. 1570 1580, 2005.

International Preliminary Report on Patentability and English Translation of the Written Opinion dated Mar. 26, 2013 for corresponding International Application No. PCT/FR2011/052177 filed Sep. 21, 2011, 7 pages.

* cited by examiner

Fig. 1

(Prior Art)

DOUBLE-ITERATIVE METHOD OF TRANSMITTING MULTIPLE STREAMS PER USER IN A MULTI-USER MIMO SYSTEM, AND A CORRESPONDING TRANSMITTER, COMPUTER PROGRAM PRODUCT, AND DATA MEDIUM

CROSS-REFERENCE TO RELATED APPLICATIONS

This Application is a Section 371 National Stage Application of International Application No. PCT/FR2011/052177, filed Sep. 21, 2011, which is incorporated by reference in its entirety and published as WO 2012/038661 on Mar. 29, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telecommunications. Within this field, the invention relates more particularly to so-called "digital" communications. Digital communications include in particular wireless communications; by way of example they also include wired communications. The communications transmission medium is commonly referred to as a propagation or transmission channel, originally referring to a channel over the air, and by extension to any channel.

The disclosure relates to transmission and reception techniques in a multi-stream multi-antenna system. It applies essentially to downlink communications and more particularly to communications from a base station to a plurality of terminals. Under such circumstances, the transmission channel is said to be a "broadcast" channel.

A data stream is associated with a user. By way of example, the streams of the different users may relate to the same telecommunications service and/or to services that are different (e.g. voice, data, video).

BACKGROUND OF THE DISCLOSURE

The multi-antenna digital communications systems that are commonly referred to as multiple-input multiple-output (MIMO) systems cover all systems having a plurality of antennas on transmission and generally a plurality of antennas on reception. A MIMO system with a single receive antenna is also known as a multiple-input single-output (MISO) system.

These systems satisfy the ever-increasing demand for a variety of telecommunications services at rates that are ever greater than existing offers. It has been proved that the capacity of MIMO channels increases in proportion to the minimum number of transmit and receive antennas.

Figure 1:
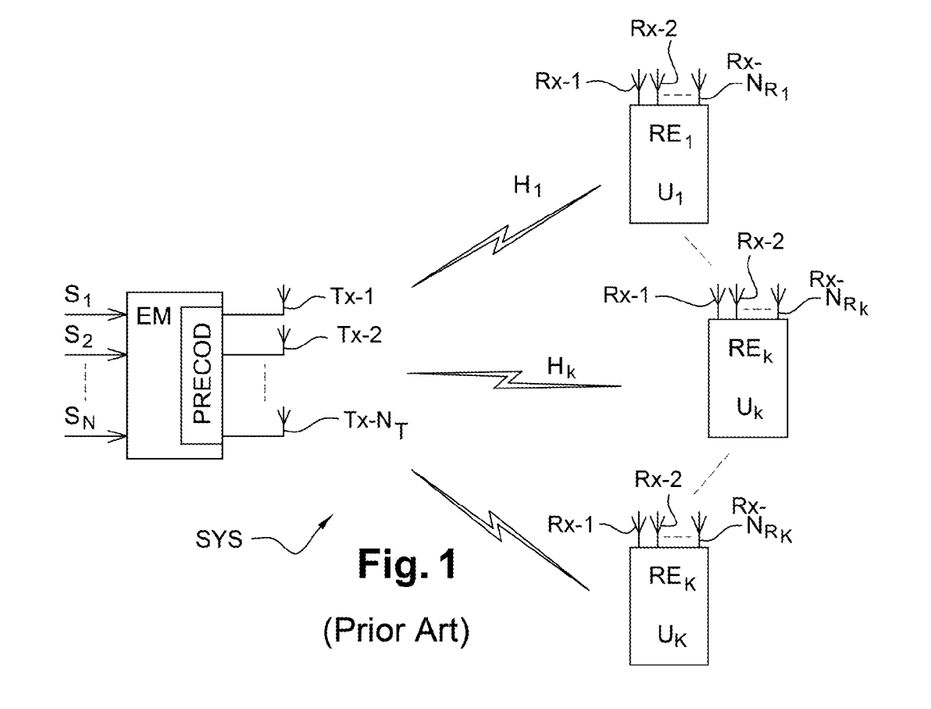
FIG. 1 is a diagram of a prior art multi-user multi-stream linear MIMO system.

An example of such a system is shown in the diagram of FIG. 1. The system comprises a base station with $N_T$ transmit antennas (Tx) and K mobile stations (mobiles) with $N_{R_k}$ receive antennas (Rx) for user k associated with mobile k. The transmission channel for user k is modeled by a matrix $H_k$ of size $N_{R_k} \times N_T$ that represents the impact of the transmission channel between the transmit antennas and the receive antennas. Each component of the matrix is a random variable of zero mean and of variance that is considered to be equal to 1.

The disclosure lies in the context of one channel per user with slow Rayleigh fading and total independence between the various channels of the various users. The context of one channel per user with slow Rayleigh fading and total independence between the various channels of the various users typically corresponds to propagation in urban surroundings, i.e. with multiple paths.

The disclosure lies in a context of "broadcasting", in the information theory meaning, i.e. in a context of transmitting different streams for different users from a transmitter. In addition, the transmitter has perfect knowledge of the transmission channel. This implies a perfect estimate of all of the components of the matrices $H_k$ for all of the users, since the channel is a broadcast channel and the transmission channel does not vary between the moment when the channel is estimated on reception and the moment when said estimate is used on transmission.

In a multi-stream multi-user MIMO system, the streams of the various users are transmitted simultaneously from the base station to the receivers of the users, knowing that a plurality of streams may be transmitted to a single user at any given instant, but that at some other given instant the same user may receive only one stream or no stream at all.

The maximum number of streams per user is $Q_k = \min(N_{R_k}, N_T)$ and the total number of streams that can be transmitted simultaneously by the MIMO system at any instant cannot exceed the maximum number Q of streams that can be served by the system:

$$Q = \min\left(\sum_{k=1}^{K} N_{R_k}, N_T\right)$$

In a multi-user MIMO (MU-MIMO) system, precoders constitute a basic building block defining the performance of the communications system. Precoders serve to separate the streams of the various users in order to minimize inter-user interference on reception and consequently improve the data rate conveyed. The performance of such a system is determined by the quantity of data streams that it can serve to the various users, with this being referred to as the sum rate (SR).

The maximum total data rate SR that can be conveyed by a MIMO system to all of the users is defined in information theory as the "ergodic" capacity of the system.

Optimizing the sum rate is based on combined optimization of the transmitter and of the receiver in order to find the combination that minimizes mean square error (MSE). It is not sufficient to concentrate on optimizing the precoder while ignoring what happens on reception, and vice versa, optimizing the receiver on its own is not sufficient for extracting the maximum SR. Furthermore, in a MIMO system with multiple receive antennas, a plurality of data streams can be transmitted to a single user. This increases the difficulty of determining the best way of allocating the streams to the users and the respective powers to allocate to them.

Known techniques for multi-user MIMO systems are based on criteria such as minimum mean square error (MMSE) and signal to leakage-and-noise ratio (SLNR) that enable the system to be optimized.

Theoretical work has shown that the capacity of a MU-MIMO broadcast channel can be achieved with the help of a so-called "dirty paper coding" (DPC) [3, 4] algorithm. Nevertheless, in spite of great advantage in computers, DPC precoding remains an algorithm that is very difficult to put into place because of the computation power required.

Thus, sub-optimal solutions of linear precoders with little complexity have been used.

A first category of linear precoders implements so-called "non-iterative linear" algorithms that are also known as direct or closed form (CF) algorithms, e.g. as described in [1, 6, 7]. For each stream, those algorithms determine a pair of vectors: a transmit vector and a receive vector. The vector pairs relating to all of the users are calculated by the base station. The base station informs the users about their receive vectors, typically by using a signaling channel. The base station transmits the information of each stream while using the corresponding transmit vector. All of the streams are transmitted simultaneously. On reception, each receiver associated with a user makes use of the receive vector that has been communicated thereto by the base station in order to combine the signals received over the various antennas and in order to extract the samples corresponding to the user's stream.

A second category of linear precoders implements iterative algorithms, certain implementations of which are described in [2, 5, 8].

[8] describes an iterative precoder based on a weighted minimum mean square error (WMMSE). By considering a matrix W of weights for the various streams of all of the users (in other words $W = \{W_1, \ldots, W_K\}$) and the set of receivers $D = \text{diag}\{D_1, \ldots, D_K\}$ used by the various users, the corresponding WMMSE precoder is given by:

$$T = \text{diag}\{T_1, \ldots, T_K\} = \beta \left( H^H D^H W D H + \frac{tr(WDD^H)}{P_T} I_{N_T} \right)^{-1} H^H D^H W \quad (1.1)$$

Thus the precoder corresponding to user k is given by:

$$T_k = \beta \left( \sum_{j=1}^{K} H_j^H D_j^H W_j D_j H_j + \frac{1}{P_T} tr(W_j D_j D_j^H) I_{N_T} \right)^{-1} H_k^H D_k^H W_k$$

where $\beta$ is a scalar factor in order to satisfy the power constraint:

$$\sum_{j=1}^{K} tr(T_i T_i^H) = P_T$$

That precoder depends on the weights W allocated to the various streams and on the decoders $D_k$, $k \in \{1, \ldots, K\}$ for the users, which means that it is necessary to use an iterative method in order to optimize them.

Optimization therefore requires the receivers to be defined. Among the various types of receiver in existence, [8] proposes a minimum mean square error (MMSE) receiver. The analytic expression for the MMSE is as follows:

$$D_k = T_k^H H_k^H \left( H_k T_k T_k^H H_k^H + I_{N_{R_k}} + \sum_{i=1, i \neq k}^{K} H_k T_i T_i^H H_k^H \right)^{-1} \quad (1.3)$$

Thereafter, it is necessary to define the weights to be given to each of the streams. This distribution must be inversely proportional to the MSE. It is determined by equation (1.4) as being the inverse of the MSE error matrix calculated for each user:

$$W_k = \left( I_k + T_k^H H_k^H \left( I_{N_{R_k}} + \sum_{i=1, i \neq k}^{K} H_k T_i T_i^H H_k^H \right)^{-1} H_k T_k \right) \quad (1.4)$$

The method described in [8] is as follows:
1. Initialize the precoders $T_k$, $k \in \{1, \ldots, K\}$.
2. Use equation (1.3) to calculate the MMSE decoders corresponding to the precoders $T_k$ for each user.
3. Calculate a new distribution of weights minimizing the MSE given by equation (1.4).
4. Recalculate the new precoders in application of equation (1.1).
5. Repeat steps 2 to 4 to convergence.

In order to analyze the performance of the system as obtained in this way, reliance is placed on the value of the sum rate of the system which is the sum of the SRs offered to the various users:

$$SR = \sum_{k=1}^{K} \log_2 \left( I + \frac{H_k T_k T_k^H H_k^H}{\Gamma_k + N_0 I} \right) \quad (1.5)$$

In which the term:

$$\Gamma_k = H_k \sum_{j=1, j \neq k}^{K} T_j T_j^H H_k^H$$

represents the interference generated by the other users and picked up by the user k.

Figure 5A:
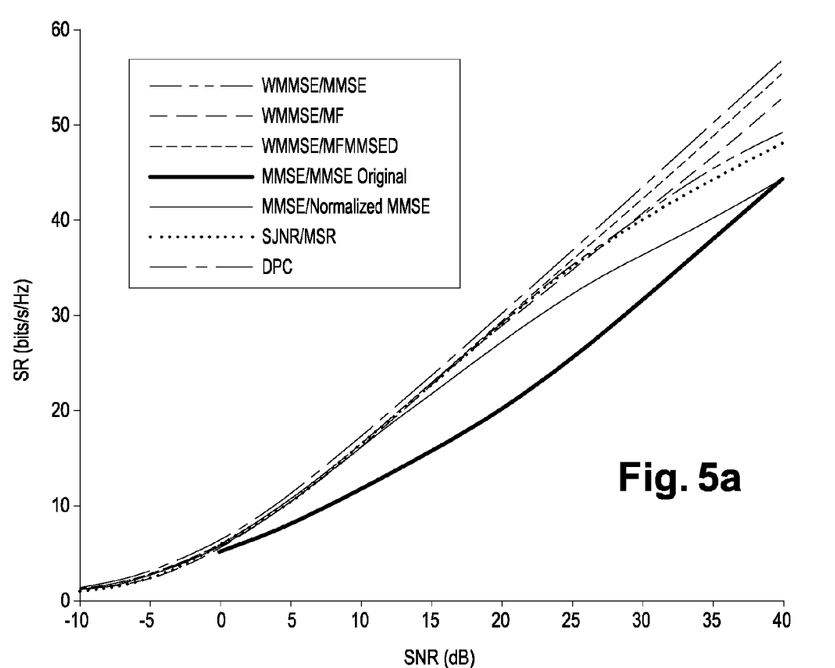
FIGS. 5a and 6 are graphs showing the results of simulations giving a mean sum rate as performed on the transmission channel implementations as a function of a total transmitted power level that has a direct impact on the signal-to-noise ratio on reception for a multi-stream multi-user MIMO system implementing three different algorithms.
Figure 5B:
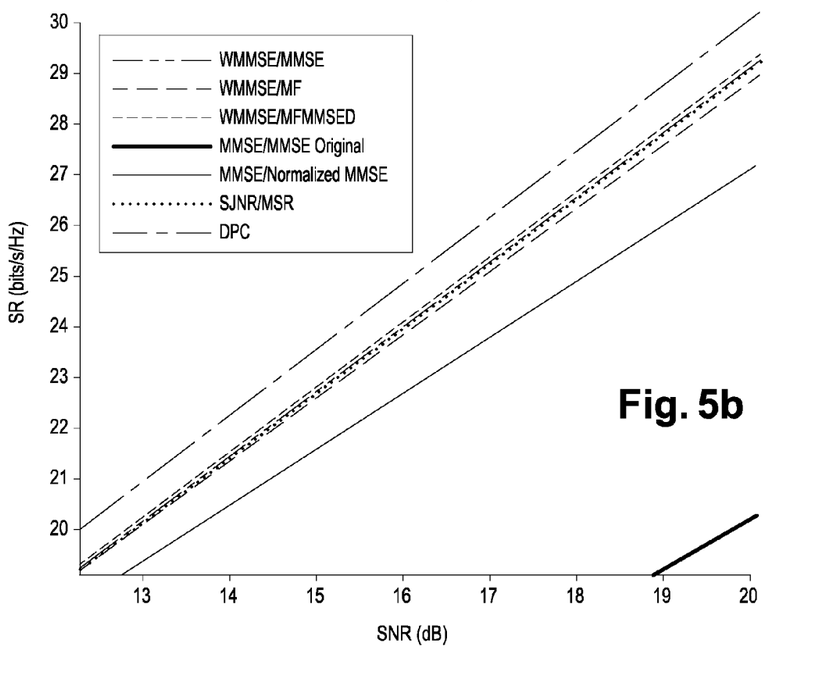
Figure 5C:
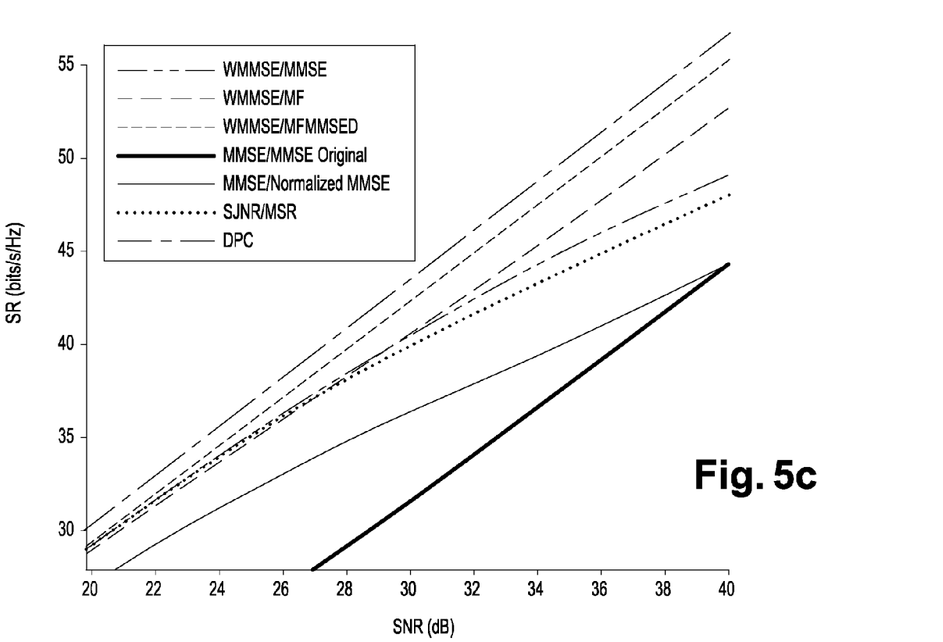

This method presents saturation with a high signal-to-noise ratio (SNR) with the slope of the curve varying as shown in FIGS. 5a-5c. This problem of saturation is in addition to a problem of convergence that is known for simple iterative solutions.

Equation (1.1) for calculating the precoder is a direct function of the decoders used by the various users. As a result, the decoders that are selected have a direct impact on the performance of the system obtained using [8], but there does not exist a decoder that makes it possible to obtain improvements for all SNRs.

One solution consists in applying a plurality of algorithms with different decoders and selecting the best, but that has the drawback of hugely increasing complexity and consumption of computation resources, while still not guaranteeing that the best performance will be obtained.

SUMMARY

An embodiment of the invention proposes a transmission technique and a reception technique for a multi-stream multi-user MIMO system that enables the prior art optimization of the system to be improved for better maximization of the transmission rates of the system. The multi-stream multi-user system MIMO system comprises $N_T$ transmit antennas and $$\sum_{k=1}^{K} N_{R_k}$$

receive antennas associated with K receivers respectively associated with K users. The MIMO system comprises a transmitter that implements a multi-stream transmission method of an embodiment of the invention for transmitting N (N≤Q) data streams respectively allocated to K different users.

The multi-stream transmission method of an embodiment of the invention is particularly remarkable in that it comprises:
- a succession of two different iterative algorithms for calculating K precoding matrices of a linear precoder and K decoding matrices of a receiver, the receiver being of the normalized matched filter (MF) type with a Frobenius norm for the first algorithm, and the second iterative algorithm being initialized by a value output by the first iterative algorithm; and
- before each calculation of precoding matrices, calculating weights for weighting all of the streams.

The iterative algorithms do not all present the same features. The inventors have observed, contrary to all expectation, that cascading two iterative algorithms of different types makes it possible to improve the sum rate that is achieved compared with the rate that is achieved with a single iterative algorithm, but without that increasing the overall number of iterations. This cascade has the feature of reducing the impact of local maxima on the convergence process and consequently of increasing the convergence of the second iterative algorithm towards an absolute maximum. The value with which the second algorithm is initialized is obtained after a plurality of iterations of the first iterative algorithm and is no longer obtained in arbitrary manner. Thus, determination of the initialization value takes account of the operating conditions of the MIMO system (transmission channel, SNR, number of antennas), unlike making an arbitrary choice.

The changeover from the first algorithm to the second algorithm is performed dynamically by using an exit test based on a threshold for the variations in the data rate achieved over a given window of iterations. Alternatively, a maximum number of iterations may be set. This test ensures that the values of the initial matrices used by the second algorithm take sufficient account of the variations in operating conditions; the number of times the first algorithm is iterated is therefore variable and a function of those operating conditions.

Typically, the first iterative algorithm is selected as presenting non-stable variation of the sum rate and the second algorithm is selected as presenting strictly increasing variation of the sum rate.

More particularly, the first and second algorithms take account of a type of linear precoding known as WMMSE that minimizes mean square error and that makes it possible to process multiple streams.

In a particular implementation, the first algorithm takes account of receivers of a first type known as MF and normalized with the Frobenius norm, and the second algorithm takes account of a second type of receiver known as MMSE. This selection is particularly advantageous since the MF type receiver makes it possible to obtain optimum performance levels at very high SNRs, whereas the MMSE type receiver possesses good results with low SNRs, thus making it possible to obtain a multipurpose solution.

An embodiment of the invention thus makes it possible to get round the problems of local maxima by combining iterative solutions based on different receivers so as to take advantage of their different strong points, and consequently so as to improve the value of the SR of the system.

An embodiment of the invention can also be expressed in the more detailed form of a multi-stream transmission method for transmitting N data streams allocated respectively to K different users, implemented by a transmitter for a multi-user MIMO system having $N_T$ transmit antennas and $$\sum_{k=1}^{K} N_{R_k}$$

receive antennas associated with K receivers respectively associated with K users. The method comprises:
- initializing precoding matrices using linear precoding of a first type (MF);
- acting iteratively with a minimum of $WIN_{MF}$ iterations to calculate decoding matrices, initially taking account of the initialized precoding matrices, the decoding matrices being for a first type of receiver, of the normalized MF type with a Frobenius norm, to calculate weights for all of the streams for weighting the following calculation of precoding matrices, and to calculate precoding matrices with linear precoding of a second type (WMMSE) taking account of the weights, with a test for stopping iterations based on a threshold for variations in the data rate achieved over the most recent $WIN_{MF}$ iterations or based on a maximum number of iterations;
- selecting K precoding matrices calculated in a single iteration and providing the best sum rate from among the precoding matrices calculated over the window $WIN_{MF}$;
- acting iteratively, to calculate decoding matrices for a second type of receiver (MMSE) different from the first, initially taking account of the selected precoding matrices, to calculate weights for all of the streams for optimizing the following calculation of precoding matrices, and to calculate precoding matrices using the linear precoding of the second type (WMMSE) taking account of the weights, with a test for stopping the iterative calculation based on a threshold for variation in the data rate between successive iterations or based on a maximum number of iterations;
- transmitting the K last-calculated decoding matrices respectively to the K receivers receiving the N streams; and
- precoding the N streams using the K most-recent calculated precoding matrices.

An embodiment of the invention also provides a multi-stream transmitter adapted for a MIMO multi-user telecommunications system having $N_T$ transmit antennas for connection to the transmitter, $$\sum_{k=1}^{K} N_{R_k}$$

receive antennas, and K receivers respectively associated with K users and respectively connected to $N_{R_k}$ of the $$\sum_{k=1}^{K} N_{R_k}$$

receive antennas for simultaneously transmitting N data streams allocated respectively to the K users. The transmitter comprises:

K linear precoders of transmission matrices $T_k$ to generate K intermediate vectors of size $N_T \times 1$;

for each precoder, calculation means (CALCOD) adapted for:

acting iteratively with a minimum of $WIN_{MF}$ iterations to calculate a decoding matrix for a first type of receiver, of normalized MF type with a Frobenius norm, calculating weights for all of the streams for weighting the following calculation of the precoding matrices, and calculating precoding matrices with linear precoding of a second type (WMMSE) taking account of the weights, with a test for stopping iterations based on a threshold for variations in the data rate achieved over the last $WIN_{MF}$ iterations or based on a maximum number of iterations;

selecting K precoding matrices calculated in a single iteration providing the best sum rate among the precoding matrices calculated over the window $WIN_{MF}$; and acting iteratively to calculate decoding matrices for a second type of receiver (MMSE) different from the first, initially taking account of the selected precoding matrices, calculating weights for all of the streams for weighting the following calculation of the precoding matrices, and calculating the precoding matrices with linear precoding of the second type (WMMSE) taking account of the weights, with a test for stopping the iterative calculation based on a threshold for variation in data rate between successive iterations or based on a maximum number of iterations;

the K transmit matrices of the K linear precoders being equal to the K most recent calculated precoding matrices;

$N_T$ adders for adding the K intermediate vectors $T_k s_k$ to generate a vector for feeding the $N_T$ antennas; and transmitter means for transmitting the K most recently calculated decoding matrices to the K receivers.

An embodiment of the invention also provides a MIMO multi-user telecommunications system including a transmitter adapted in accordance with an embodiment of the invention, $N_T$ transmit antennas connected to the transmitter, $$\sum_{k=1}^{K} N_{R_k}$$

receive antennas, and K adapted receivers associated respectively with K users and connected respectively to $N_{R_k}$ of the $$\sum_{k=1}^{K} N_{R_k}$$

receive antennas. Each receiver k comprises:

receiver means for receiving the stream decoding matrix; and a linear decoder adapted to extract the streams served for the user k from among the N streams by means of the decoding matrix.

In an embodiment, each receiver has means for estimating the matrix $H_k$ of the propagation channel.

In a preferred implementation, the steps of the multi-stream transmission method are determined by the instructions of a transmission program incorporated in an electronic circuit such as a chip that is itself suitable for being placed in an electronic device such as a transmitter. The transmission method of an embodiment of the invention may equally well be implemented when the program is loaded into a calculation member such as a processor or the equivalent with its operation then being controlled by executing the program.

Consequently, an embodiment of the invention also provides a computer program, in particular a computer program on or in a data medium and adapted to implement an embodiment of the invention. The program may make use of any programming language, and may be in the form of source code, object code, or code intermediate between source code and object code such as in a partially compiled form, or in any other desirable form for implementing a method of an embodiment of the invention.

The data medium may be any entity or device capable of storing the program. For example, the medium may comprise storage means such as a read-only memory (ROM), e.g. a compact disk (CD) ROM, or a microelectronic circuit ROM, or indeed magnetic recording means, e.g. a floppy disk or a hard disk.

Alternatively, the data medium may be an integrated circuit in which the program is incorporated, the circuit being adapted to execute or to be used in the execution of the method in question.

Furthermore, the program may be converted into a transmissible form such as an electrical or optical signal, which may be conveyed via an electrical or optical cable, by radio, or by other means. The program of an embodiment of the invention may in particular be downloaded from an Internet type network.

BRIEF DESCRIPTION OF THE DRAWINGS

Other characteristics and advantages appear from the following description of implementations given as non-limiting examples, which description is made with reference to the following accompanying figures.

FIGS. 5b and 5c are enlargements of portions of FIG. 5a.

DETAILED DESCRIPTION OF ILLUSTRATIVE EMBODIMENTS

The diagram of FIG. 1 shows a prior art multi-stream multi-user linear MIMO system. The system SYS comprises a transmitter with a precoder PRECOD made of K precoders at the base station, and K receivers with the users, all of which receivers are of linear structure. The transmitter is connected to $N_T$ transmit antennas. The receiver of user k is connected to $N_{R_k}$ receive antennas. The broadcast channel from the transmitter to the receivers is represented by K transmission channels of matrix $H_k$.

Figure 2:
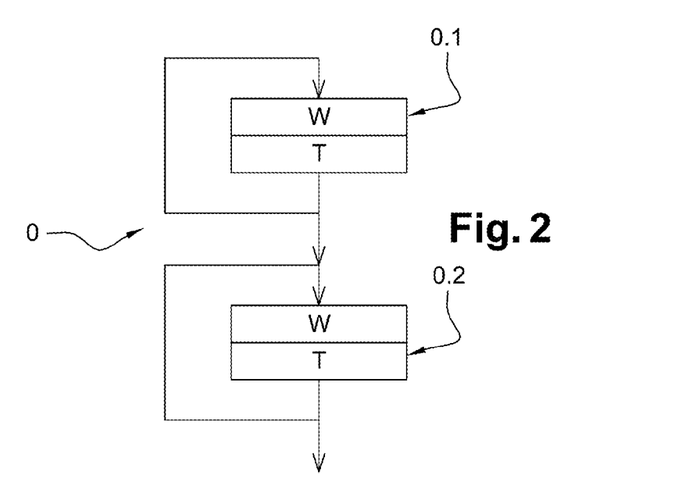
FIG. 2 is a flow chart of a method of an embodiment of the invention.

The diagram of FIG. 2 is a flow chart of a method 0 of an embodiment of the invention. The multi-stream transmission method for transmitting N data streams allocated to K different users is implemented by a transmitter for a multi-user MIMO system having $N_T$ transmit antennas and $$\sum_{k=1}^{K} N_{R_k}$$

receive antennas associated with K receivers associated respectively with K users. The method comprises:
- a succession of two different iterative algorithms (0.1, 0.2) for calculating K precoding matrices of a linear precoder and K receiver decoding matrices; and
- before calculating each precoding matrix T, calculating a weight W for weighting all of the streams.

The receiver corresponding to the first algorithm is of the normalized matched filter (MF) type with a Frobenius norm. The second iterative algorithm is initialized by an output value from the first iterative algorithm.

Figure 3:
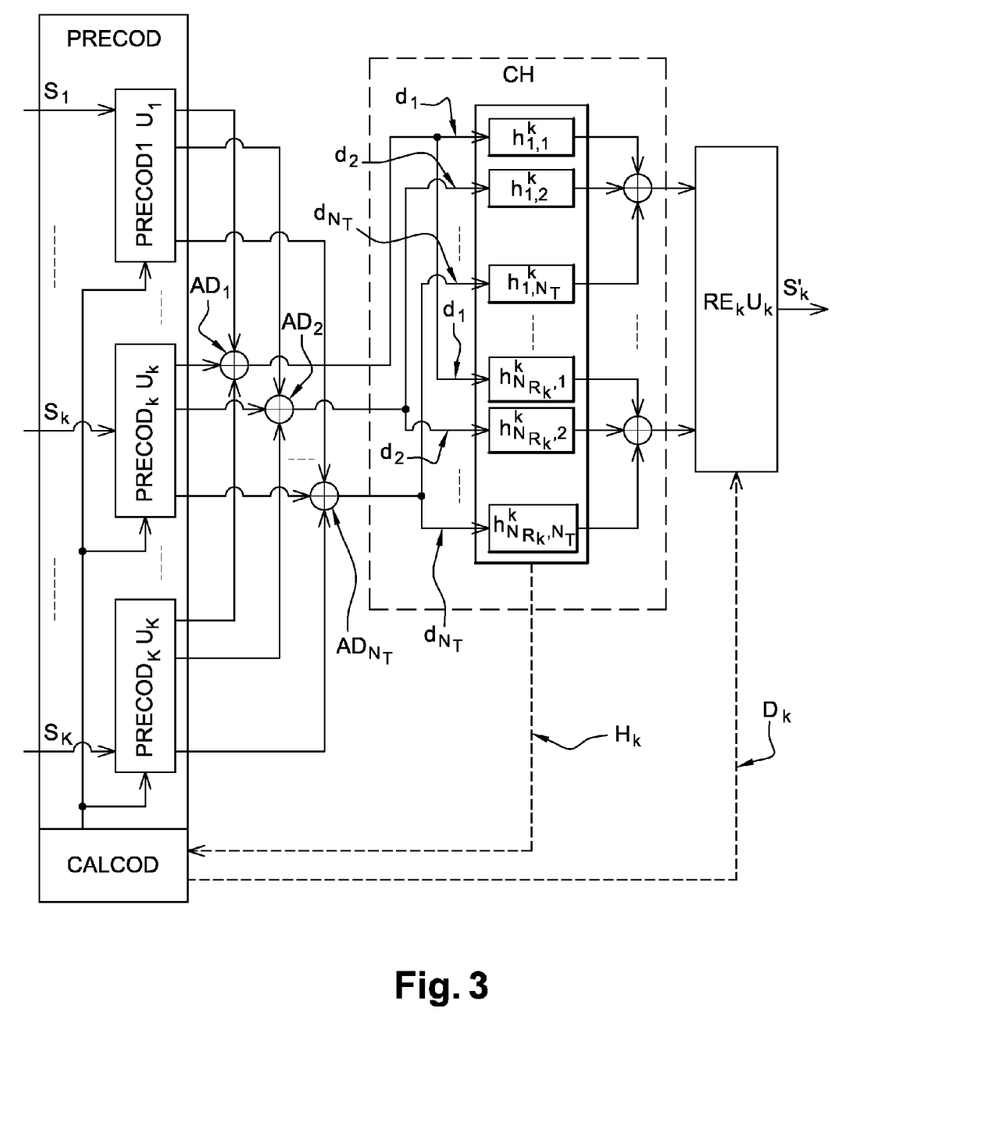
FIG. 3 is a detailed diagram of the precoding of the $s_1, \ldots, s_K$ vectors containing the N data streams $S_1, \ldots, S_N$ of an embodiment of the invention.

FIG. 3 is a detailed diagram of the precoding of the N data streams. These streams are placed in vectors $s_k$ transmitted to each user depending on the result of the optimization performed, where $s_k=V_k s_k'$. The vectors $s_k'$ are vectors of size $N_{R_k} \times 1$ with rank $(T_k)$ first elements containing the selected streams for user k and padded out with 0s. The matrix $V_k$ is the right unitary matrix of the Eigen value decomposition of the matrix $T_k$ or "singular-value decomposition" (SVD) that enables the matrix $T_k$ to be written in factorized form $U_k \Sigma_k V_k^H$, with $U_k$ being the unitary matrix containing the left-singular vectors, $V_k$ being the unitary matrix of the right-singular vectors, and $\Sigma_k$ being the zero matrix with the exception of a diagonal that contains the singular values. The precoder PRECOD is made up of K precoders $PRECOD_1, \ldots, _K$. The streams for a user k that are to be found in the vector $s_k=V_k s_k'$ are multiplied by the transmit matrix $T_k$ of the precoder k. The components of the vectors from the outputs of the precoders, or intermediate vectors, are added by $N_T$ adders $AD_1, \ldots, _{N_T}$. The output vector $d_1, \ldots, d_{N_T}$ from the adders corresponds to a signal transmitted over the propagation channel, the $N_T$ transmit antennas not being shown. The propagation channel CH is represented by its matrix H. The receiver $RE_k$ of user k makes use of $N_{R_k}$ signals received via $N_{Rk}$ receive antennas that are not shown. The signal received by an antenna i comes from the $N_T$ transmit antennas and is therefore equal to the transmitted signal $d_1, \ldots, d_{N_T}$ weighted by the coefficients $h_{i,1}, \ldots, h_{i,N_T}$ of the channel.

The precoder has a calculation module CALCOD for calculating the transmit and receive matrices for the K users on the basis of the knowledge of the coefficients $H_k$ of the propagation channel for each user k.

Unlike prior art techniques that determine the initial transmit and receive matrices separately, the calculation module CALCOD of an embodiment of the invention is adapted to determine these initial matrices jointly by implementing a first multi-stream multi-user iterative algorithm for a MU-MIMO system that takes account of the general expression for the sum rate of the multi-user MIMO system SYS in order to maximize the sum rate that is transferred to the channel CH.

After several iterations, typically at least three, the calculation module CALCOD switches from the first iterative algorithm to the second iterative algorithm and uses the matrices calculated by the first iterative algorithm to initialize the values of the matrices of the second algorithm.

This changeover or "flip" point between the algorithms is crucial for convergence. Changing from a receiver of a first type to a receiver of a second type too soon can lead to poor initialization that cannot be corrected by the receiver of the second type, and changing receiver too late fails to make use of the advantages that are presented by a receiver of the second type. A decision to change over is performed dynamically, thereby making it possible to take account of the variation of the optimum value of the changeover value as a function of the nature of the channel, of the SNR of the system, and of the channel configuration used (numbers of transmit and receive antennas).

According to an embodiment of the invention, the changeover from the first algorithm to the second algorithm is performed by using a decision-making method based on a stop criterion. This decision-making method consists in using a moving window of previously-fixed size $WIN_{MF}$ to observe variation in the first algorithm while it is being executed. This first algorithm is executed to convergence. Convergence is determined by the value of the sum rate SR stabilizing over the observation window. Once this first iterative algorithm has stabilized, and thus has converged, the calculation module CALCOD switches over to the second algorithm and uses the convergence point as the initialization point (defined by the transmit and receive initialization matrix pair) and it executes the second algorithm. Initialization of the second algorithm requires knowledge only of the transmit matrix. The end of the algorithm is defined either by a maximum number of iterations $N_{max}^{iter}$ or by the sum rate SR of the evaluated system stabilizing between successive iterations.

Figure 4:
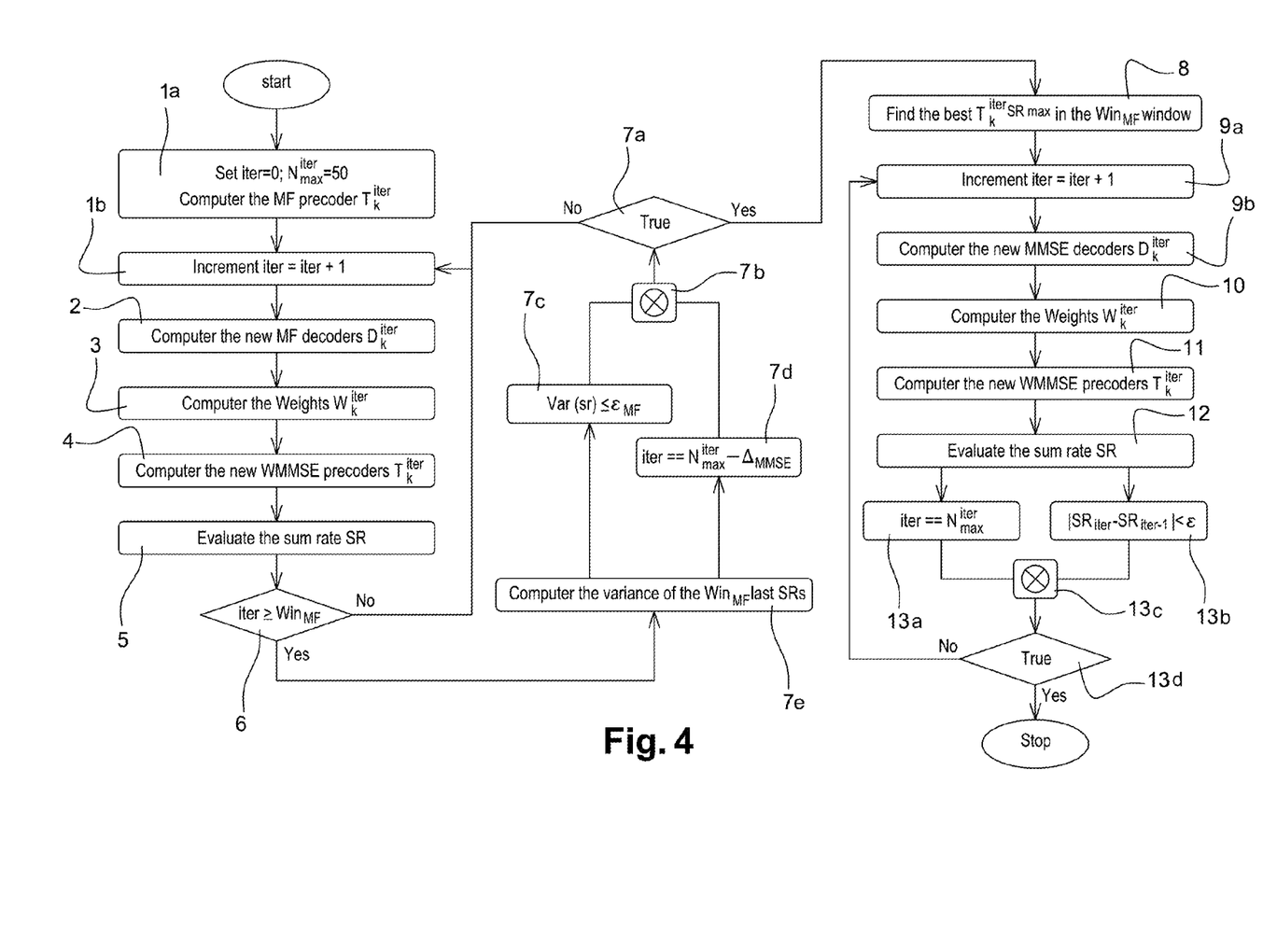
FIG. 4 is a detailed flow chart of an implementation of a method of an embodiment of the invention.

In a preferred implementation of the method, the first iterative algorithm associates a WMSSE precoder and an MF receiver, and the second algorithm associates a WMMSE precoder and an MMSE receiver. The progress of the method shown in the flow chart of FIG. 4 is as follows for all the N streams:

1(a)–1(b)/Initializing the parameters iter=0, $N_{max}^{iter}$ (maximum overall number of iterations), $WIN_{MF}$ (observation window), $\epsilon$, $\epsilon_{MF}$ and $\Delta_{MMSE}$ (minimum number of iterations of the second algorithm, $\Delta_{MMSE} \in \mathbb{N}^*$ and $1 \leq \Delta_{MMSE} \leq N_{max}^{iter} - WIN_{MF}$), and initializing the precoders. The precoders are initialized by using a linear precoder written $T_k^{iter}$, k=1, ..., K of the MF type as given by $T_k^{iter} = bH_k^H$ where b is a normalization factor making it possible to satisfy the power constraints $$\sum_{i=1}^{K} tr(T_i T_i^H) = P_T.$$

After the precoders have been initialized, the method increments the iteration index: iter=iter+1.

2/ The method calculates the MF decoders $D_k^{inter}$ corresponding to the precoders $T_k^{iter-1}$ for each user. The MF decoder is given by the equation:

$$D_k = \frac{(H_k T_k)^H}{\|(H_k T_k)\|} \qquad (1.2)$$

where $\|A\|$ represents the Frobenius norm of the matrix A.

3/ The method calculates the new weight $W_k^{iter}$ as a function of the precoders $T_k^{iter-1}$ for all of the streams so as to minimize the MSE in application of equation (1.4).

4/ The method calculates the new precoders $T_k^{iter}$ as a function of $D_k^{iter}$ and $W_k^{iter}$ using equation (1.1).

5/ The method calculates the sum rate $SR_{iter}$ that is obtained by injecting $T_k^{iter}$ into equation (1.5).

6/ Steps 2/ to 5/ are repeated $WIN_{MF}$ times, each time incrementing iter=iter+1.

7(a)-7e)/ The method verifies convergence of the MF algorithm by verifying the constraint:

$$\text{Var}([SR_{iter-WIN_{MF}}\ldots SR_{iter}]) = \sum_{i=0}^{WIN_{MF}} \left(SR_{iter-i} - \frac{1}{WIN_{MF}}\sum_{i=0}^{WIN_{MF}} SR_{iter-i}\right)^2 \leq \varepsilon_{MF}$$

If the condition is satisfied, the method moves on to 8/. Else the method increments the iteration index: iter=iter+1 and loops back to step 2/, unless the iteration index reaches iter=$N_{max}^{iter}$-$\Delta_{MMSE}$, in which case the method moves on to 8/.

8/ The method selects the precoders that give the best performance in the window $WIN_{MF}$ under consideration. For this purpose, the method determines the maximum value of the sum rate calculated over the window $WIN_{MF}$, determines the corresponding iteration: $iter_{SRmax}$ and the precoders calculated for this iteration, and stores them: $T_k^{iter}=T_k^{iter_{SRmax}}$. Selection requires the method to save the precoders calculated over the window $WIN_{MF}$ together with the corresponding SRs.

9(a)-9(b)/ The method increments the iteration counter: iter=iter+1 and calculates the MMSE decoders $D_k^{iter}$ corresponding to the decoders $T_k^{iter-1}$ for each user k. The MMSE precoder is given by equation (1.3).

10/ The method calculates the new weight $W_k^{iter}$ as a function of the precoders $T_k^{iter-1}$ so as to minimize the MSE given by equation (1.4).

11/ The method calculates the new precoders $T_k^{iter}$ by injecting $W_k^{iter}$ and $D_k^{iter}$ into equation (1.1).

12/ The method calculates the sum of the sum rates $SR_{iter}$ obtained by injecting $T_k^{iter}$ into equation (1.5).

13/ Steps 9/ to 12/ are repeated until the iterative algorithm converges. Convergence is determined by the value of the sum rate stabilizing $|SR_{iter}-SR_{iter-1}|<\epsilon$; or by exceeding a maximum number of iterations $N_{max}^{iter}$.

The following example serves to illustrate a method of an embodiment of the invention. It relates to a multi-user MIMO system having firstly a base station with $N_T=4$ transmit antennas and secondly four receivers respectively associated with K=4 users, each having $N_{R_k}=4$ receive antennas. The simulations took account of Rayleigh channels that are completely decorrelated between the K users. The values used for the parameters were as follows: $WIN_{MF}=5$, $\epsilon=10^{-3}$, $\Delta_{MMSE}=5$ and $\epsilon_{MF}=10^{-3}$. The total number of iterations $N_{max}^{iter}$ is set at 50.

The performance levels were thus obtained without introducing additional complexity over the single-iterative algorithm described in [8]. The variation in the sum rate of the system averaged over the channel configurations is shown in FIGS. 5a, 5b, and 5c. These figures include the curves for the single-iterative algorithms "WMMSE/MMSE" and "WMMSE/MF" representing the iterative algorithm of [8] with a WMMSE precoder and respectively an MMSE receiver for the first curve and an MF receiver for the second curve. The curve "WMSSE/MFMMSED" corresponds to a method of an embodiment of the invention.

A comparison of the curves in FIG. 5a shows that a method of an embodiment of the invention makes it possible to obtain the best of the two individual iterative solutions proposed in [8]. It also makes it possible to achieve an additional improvement that is quite large, being of the order of 3 bits per second per hertz (bits/s/Hz) compared with the high SNR WMMSE/MF solution (given by curve 5c), without that making it suffer from the poor performance of that algorithm with low SNR as shown in FIG. 5b. Indeed, the curves in FIG. 5b also show an improvement (even if it is small) compared with the best algorithm, i.e. WMMSE/MMSE.

These improved performance levels are thus obtained without introducing additional complexity over the single iterative algorithm described in [8]. A comparison of the curves of an embodiment of the invention with the single-stream solutions represented by the curves "MMSE/Normalized MMSE", "SJNR/MSR" described in [9] and "MMSE/MMSE Original" described in [3] show that even in a system that is favorable to single-stream optimization, the performance levels obtained by an embodiment of the invention are clearly better. In addition, comparing the curve "WMMSE/MFMMSED" with the curve for the channel capacity obtained with a DPC algorithm as described in [10] shows that the method of an embodiment of the invention presents a curve that is very close to and parallel with the curve obtained with a DPC algorithm and thus manages to separate the streams clearly.

Another example serves to illustrate a method of an embodiment of the invention. It relates to a multi-user MIMO system having a base station with $N_T=4$ transmit antennas and two receivers associated respectively with K=2 users, each having $N_{R_k}=4$ receive antennas. The simulations took account of Rayleigh channels that are completely decorrelated between the K users. The values used for the parameters were as follows: $WIN_{MF}=5$, $\epsilon=10^{-3}$, $\Delta_{MMSE}=5$ and $\epsilon_{MF}=10^{-3}$. The total of iterations $N_{max}^{iter}$ was set at 50.

Figure 6:
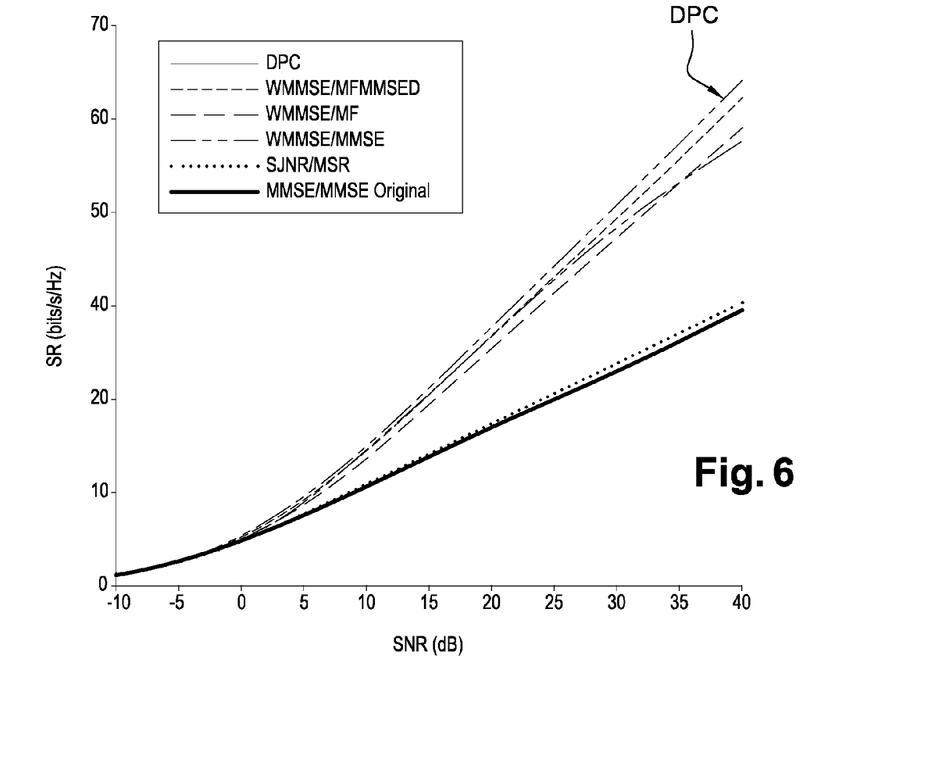

FIG. 6 shows the same algorithms as those shown in FIG. 5. This example shows even more clearly the considerable improvements obtained by the method of an embodiment of the invention. Indeed, a comparison with existing multi-stream solutions shows that the superiority in terms of performance level continues to be confirmed. A comparison with the single-stream solutions shows that the superiority becomes very large with slopes that are very different. This can easily be explained by the degrees of freedom that are used in the system. The single-stream solutions focus on optimizing one stream per user (in this case a total of two streams), whereas the systems can accommodate more (a total four streams in this case).

REFERENCES

[1] Y. Wu, J. Zhang, M. Xu, S. Zhou, Xibin Xu, "Multiuser MIMO Downlink Precoder Design Based on the Maximal SJNR Criterion," IEEE GLOBECOM 2005 proceedings, pp. 2694-2698.

[2] H. Wang, X. Xu, M. Zhao, W. Wu, Y. Yao, "Robust Transmission for Multiuser MIMO Downlink Systems with Imperfect CSIT," IEEE WCNC 2008, pp. 340-344.

[3] M. Costa, "Writing on Dirty Paper," IEEE Trans. Inf. Theory, Vol. 29, No. 3, pp. 439-441, May 1983.

[4] G. Caire and S. Shamai, "On the achievable throughput of a multiantenna Gaussian broadcast channel," IEEE Trans. Inform. Theory, Vol. 49, No. 7, pp. 1691-1706, July 2003.

[5] J. Zhang, Y. Wu, S. Zhou, and J. Wang, "Joint linear transmitter and receiver design for the downlink of multiuser MIMO systems," IEEE Commun. Lett., Vol. 9, No. 11, pp. 991-993, Nov. 2005.

[6] M. Lee and S. K. Oh, "A Per-User Successive MMSE Precoding Technique in Multiuser MIMO Systems," IEEE Vehicular Technology Conference (VTC2007-Spring), pp. 2374-2378, Apr. 22-25, 2007.

[7] Q. H. Spencer, A. L. Swindlehurst, and M. Haardt, "Zero-forcing methods of downlink spatial multiplexing in multiuser MIMO channels," IEEE Trans. Signal Process., Vol. 52, No. 2, pp. 461-471, Feb. 2004.

[8] S. S. Christensen, R. Agarwal, E. de Carvalho, J. M. Cioffi, "Weighted Sum rate Maximization Using Weighted MMSE for MIMO-BC Beamforming Design," *Communications, 2009. ICC '09. IEEE International Conference on*, Vol., No., pp. 1-6, Jun. 14-18, 2009.

[9] M. Amara, Y. Yuan-Wu, and D. Slock, "Receiver and transmitter iterative optimization using maximum sum rate criterion for multi-user MIMO systems," in ISCCSP 2010. IEEE International Symposium on Communications, Control and Signal Processing, March 2010.

[10] N. Jindal, W. Rhee, S. Jafar, and Goldsmith, "Sum power iterative water-filling for multi-antenna gaussian broadcast channels," IEEE Trans. Inform. Theory, Vol. 51, pp. 1570-1580, 2005.

Although the present disclosure has been described with reference to one or more examples, workers skilled in the art will recognize that changes may be made in form and detail without departing from the scope of the disclosure and/or the appended claims.

The invention claimed is:

1. A multi-stream transmission method for transmitting N data streams allocated to K different users, the method being implemented by a transmitter for a multi-user MIMO system having $N_T$ transmit antennas and $$\sum_{k=1}^{K} N_{R_k}$$

receive antennas associated with K receivers respectively associated with the K users, the method comprising:
  performing by the transmitter a succession of first and second different iterative algorithms for calculating K precoding matrices of a linear precoder and K decoding matrices of a receiver, the receiver being of a normalized matched filter type with a Frobenius norm for the first iterative algorithm, and the second iterative algorithm being initialized by a value output by the first iterative algorithm; and
  before each calculation of the precoding matrices, calculating by the transmitter weights for weighting all of the data streams,
  wherein K, $N_T$, N, and $N_{R_k}$ are integer numbers with N>K.

2. The method according to claim 1, wherein the second iterative algorithm is adapted for a second type of receiver presenting between successive iterations strictly increasing variation of a sum rate of the multi-user MIMO system.

3. A multi-stream transmission method for transmitting N data streams allocated respectively to K different users, the method being implemented by a transmitter for a multi-user MIMO system having $N_T$ transmit antennas and $$\sum_{k=1}^{K} N_{R_k}$$

receive antennas associated with K receivers respectively associated with the K users, the method comprising:
  initializing precoding matrices of a precoder using linear precoding of a first type;
  acting iteratively with a minimum of $WIN_{MF}$ iterations to calculate with the transmitter decoding matrices, $WIN_{MF}$ being the size of a window, initially taking account of the initialized precoding matrices, the decoding matrices being for a first type of receiver, of a normalized matched filter with a Frobenius norm, to calculate weights for all of the data streams for weighting the following calculation of the precoding matrices, and to calculate the precoding matrices with linear precoding of a second type taking account of the weights, with a test for stopping iterations based on a threshold for variations in a sum rate of the multi-user MIMO system achieved over the most recent $WIN_{MF}$ iterations or based on a maximum number of iterations;
  selecting K precoding matrices calculated in a single iteration and providing a best sum rate from among the precoding matrices calculated over the window of size $WIN_{MF}$;
  acting iteratively, to calculate with the transmitter decoding matrices for a second type of receiver different from the first type of receiver, initially taking account of the selected precoding matrices, to calculate weights for all of the data streams for optimizing the following calculation of the precoding matrices, and to calculate the precoding matrices using the linear precoding of the second type taking account of the weights, with a test for stopping the iterative calculation based on a threshold for variation in the sum rate between successive iterations or based on a maximum number of iterations;
  transmitting from the transmitter the K last-calculated decoding matrices respectively to the K receivers receiving the N data streams; and
  precoding the N data streams using the K most-recent calculated precoding matrices,
  wherein K, $N_T$, N, and $N_{R_k}$ are integer numbers with N>K.

4. The method according to claim 3, wherein the decoding matrices for the second type of receiver correspond to a receiver of Minimum Mean Square Error type that minimizes mean square error.

5. An apparatus comprising:
a multi-stream transmitter configured for a MIMO multi-user telecommunications system having $N_T$ transmit antennas for connection to the transmitter, $$\sum_{k=1}^{K} N_{R_k}$$

receive antennas, and K receivers respectively associated with K users and respectively connected to $N_{R_k}$ of the $$\sum_{k=1}^{K} N_{R_k}$$

receive antennas for simultaneously transmitting N data streams allocated respectively to the K users, the transmitter comprising:

K linear precoders configured to process transmission matrices $T_k$ to generate K intermediate vectors $T_k s_k$ of size $N_T \times 1$;

each precoder comprising:

means for acting iteratively with a minimum of $WIN_{MF}$ iterations, $WIN_{MF}$ being the size of a window, to calculate a decoding matrix for a first type of receiver, of a normalized matched filter with a Frobenius norm, calculating weights for all of the data streams for weighting the following calculation of precoding matrices, and calculating the precoding matrices with linear precoding of Weighted Minimum Mean Square Error type taking account of the weights, with a test for stopping iterations based on a threshold for variations in a sum rate of the MIMO multi-user telecommunications system achieved over the last $WIN_{MF}$ iterations or based on a maximum number of iterations;

means for selecting K precoding matrices calculated in a single iteration providing a best sum rate among the precoding matrices calculated over the window of size $WIN_{MF}$; and means for acting iteratively to calculate decoding matrices for a second type of receiver different from the first type of receiver, initially taking account of the selected precoding matrices, calculating weights for all of the data streams for weighting the following calculation of the precoding matrices, and calculating the precoding matrices with linear precoding of Weighted Minimum Mean Square Error type taking account of the weights, with a test for stopping the iterative calculation based on a threshold for variation in the sum rate between successive iterations or based on a maximum number of iterations;

wherein K transmit matrices of the K linear precoders being equal to the K most recent calculated precoding matrices;

$N_T$ adders configured to add the K intermediate vectors $T_k s_k$ to generate a vector for feeding the $N_T$ transmit antennas; and transmitter means for transmitting the K most recently calculated decoding matrices to the K receivers, wherein K, $N_T$, N, and $N_{R_k}$ are integer numbers with N>K.

6. The Apparatus of claim 5, wherein the apparatus further comprises the MIMO multi-user telecommunications system, which comprises:

the transmitter,
the $N_T$ transmit antennas connected to the transmitter, the $$\sum_{k=1}^{K} N_{R_k}$$

receive antennas, and the K receivers associated respectively with the K users and connected respectively to the $N_{R_k}$ of the $$\sum_{k=1}^{K} N_{R_k}$$

receive antennas, wherein:
each of the K receivers comprises:
receiver means for receiving a data stream decoding matrix;
a linear decoder configured to extract the data streams served for the user k from among the N data streams by means of the decoding matrix; and
means for estimating a matrix $H_k$ of a propagation channel.

7. A non-transitory computer-readable medium comprising a computer program stored thereon, said program including program instructions configured to implement a multi-stream transmission method for transmitting N data streams allocated to K different users, the method being performed by a transmitter for a MIMO multi-user system having $N_T$ transmit antennas and $$\sum_{k=1}^{K} N_{R_k}$$

receive antennas associated with K receivers respectively associated with K users, when said program is loaded in and executed by a calculation member of the transmitter for implementing the transmission method, the transmission method comprising:

performing by the transmitter a succession of first and second different iterative algorithms for calculating K precoding matrices of a linear precoder and K decoding matrices of a receiver, the receiver being of a normalized matched filter type with a Frobenius norm for the first iterative algorithm, and the second iterative algorithm being initialized by a value output by the first iterative algorithm; and before each calculation of the precoding matrices, calculating by the transmitter weights for weighting all of the data streams, wherein K, $N_T$, N, and $N_{R_k}$ are integer numbers with N>K.

* * * * *